(12) United States Patent
McAllister et al.

(10) Patent No.: US 8,539,201 B2
(45) Date of Patent: Sep. 17, 2013

(54) TRANSPOSING ARRAY DATA ON SIMD MULTI-CORE PROCESSOR ARCHITECTURES

(75) Inventors: Jeffrey S. McAllister, St. Paul, MN (US); Timothy J. Mullins, Blaine, MN (US); Nelson Ramirez, Rochester, MN (US); Mark A. Bransford, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 987 days.

(21) Appl. No.: 12/612,037

(22) Filed: Nov. 4, 2009

(65) Prior Publication Data
US 2011/0107060 A1 May 5, 2011

(51) Int. Cl.
*G06F 15/76* (2006.01)

(52) U.S. Cl.
USPC ............................................................ 712/22

(58) Field of Classification Search
None
See application file for complete search history.

(56) References Cited

U.S. PATENT DOCUMENTS

| | | | |
|---|---|---|---|
| 6,243,730 B1 * | 6/2001 | Wang | 708/401 |
| 6,625,721 B1 * | 9/2003 | Chen | 712/10 |
| 6,963,341 B1 * | 11/2005 | Mimar | 345/505 |
| 7,386,703 B2 | 6/2008 | Sandon et al. | |
| 7,937,567 B1 * | 5/2011 | Nickolls et al. | 712/220 |
| 2003/0084081 A1 * | 5/2003 | Hanounik | 708/400 |
| 2007/0106718 A1 * | 5/2007 | Shum et al. | 708/400 |
| 2007/0250683 A1 * | 10/2007 | Van Hook et al. | 712/22 |
| 2010/0023728 A1 * | 1/2010 | El-Mahdy et al. | 712/12 |
| 2010/0241824 A1 * | 9/2010 | Carlson et al. | 712/22 |

OTHER PUBLICATIONS

Kumaki, T. ; Koide, T.; Mattausch, H. J. ; Kuroda, Y.; Noda, H.; et al. "Efficient vertical/horizontal-space 1D-DCT processing based on massive-parallel matrix-processing engine" In 2007 IEEE International Symposium on Circuits and Systems (IEEE Cat. No. 07CH37868).*
Franchetti, Franz et al., "Discrete Fourier Transform on Multicore", IEEE Signal Processing Magazine, Nov. 2009, pp. 90-102.
Jun-shan, Li et al., "Image Parallel Fourier Analysis Technology Based on LS MPPM (1): principle, analysis and design of algorithm", Mini-Micro Systems Journal Paper, vol. 25, Jul. 2004, Issue 7, pp. 1303-1306—Abstract only.

* cited by examiner

*Primary Examiner* — Jacob A. Petranek
(74) *Attorney, Agent, or Firm* — Patterson & Sheridan, LLP

(57) ABSTRACT

Systems, methods and articles of manufacture are disclosed for transposing array data on a SIMD multi-core processor architecture. A matrix in a SIMD format may be received. The matrix may comprise a SIMD conversion of a matrix M in a conventional data format. A mapping may be defined from each element of the matrix to an element of a SIMD conversion of a transpose of matrix M. A SIMD-transposed matrix T may be generated based on matrix M and the defined mapping. A row-wise algorithm may be applied to T, without modification, to operate on columns of matrix M.

21 Claims, 8 Drawing Sheets

TRANSPOSING ARRAY DATA ON SIMD MULTI-CORE PROCESSOR ARCHITECTURES

BACKGROUND OF THE INVENTION

1. Field of the Invention

Embodiments of the invention generally relate to performing efficient fast Fourier transforms (FFTs) on multi-core processor architectures. More specifically, embodiments of the invention relate to transposing array data in a format tailored for efficient FFTs on SIMD multi-core processor architectures.

2. Description of the Related Art

Some currently available processors support "single instruction, multiple data" (SIMD) extensions. SIMD indicates that a single instruction operates on multiple data items in parallel. For example, an "add" SIMD instruction may add eight 16-bit values in parallel. That is, the add operation (a single operation) is performed for eight distinct sets of data values (multiple data) in a single clock cycle. Typically, the data values may be supplied as elements of a vector. Accordingly, SIMD processing is also referred to as vector processing. SIMD instructions dramatically increase execution speed by performing multiple operations as part of a single instruction. Well known examples of SIMD extensions include multimedia extension ("MMX") instructions, SSE instructions, and vectored multimedia extension ("VMX") instructions.

Calculating fast Fourier transforms (FFTs) efficiently on SIMD multicore processors has proven to be challenging. For large, one-dimensional FFTs (1D FFTs), a greater amount of parallelism may be obtained due to the larger groups of independent blocks of data processing. However, the 1D FFT is a fundamentally recursive algorithm with complexity O(N log N). Thus, for smaller-sized 1D FFTs, the amount of single-row parallelism is very small. Moreover, current libraries for performing FFTs are not tailored towards an FFT performed on a relatively smaller array of data (e.g., an FFT performed on an image size of 256×256 pixels, 512×512 pixels, or 1024× 1024 pixels). Although a degree of SIMD parallelism is extracted from the 1D FFT at larger sizes, only a small amount of intra-row algorithm parallelism is extracted at smaller sizes. Furthermore, current libraries for multi-core FFTs are standalone and do not allow the functional pipelining of work required for compute-operation-to-input/output (IO) optimization.

SUMMARY OF THE INVENTION

One embodiment of the invention includes a method for transposing a matrix on a SIMD multi-core processor architecture, comprising configuring the SIMD multi-core processor architecture to perform an operation. The operation may generally include converting a matrix M in a first format to a matrix S in a SIMD format, wherein the SIMD format allows a plurality of cores on the SIMD multi-core processor architecture to each perform a 1D FFT operation on a row of data in the matrix M in parallel; retrieving a mapping for each element of the matrix S to an element in a transpose of matrix M in a SIMD format, wherein the mappings preserve the SIMD format of S for a transposition of the matrix M; and generating, based on the retrieved mappings, a SIMD-transposed matrix T, wherein the transposed SIMD matrix T allows the plurality of cores on the SIMD multi-core processor architecture to each perform an 1D FFT operation on a transposed row of data in the matrix M in parallel.

Another embodiment of the invention includes a computer-readable storage medium containing a program, which when executed by the processor is configured to perform an operation for transposing a matrix on a SIMD multi-core processor architecture. The operation may generally include converting a matrix M in a first format to a matrix S in a SIMD format, wherein the SIMD format allows a plurality of cores on the SIMD multi-core processor architecture to each perform a 1D FFT operations on a row of data in the matrix M in parallel; retrieving a mapping for each element of the matrix S to an element in a transpose of matrix M in a SIMD format, wherein the mappings preserve the SIMD format of S for a transposition of the matrix M; and generating, based on the retrieved mappings, a SIMD-transposed matrix T, wherein the transposed SIMD matrix T allows the plurality of cores on the SIMD multi-core processor architecture to each perform an 1D FFT operations on a transposed row of data in the matrix M in parallel.

Still another embodiment of the invention includes a system having a processor and a memory containing a program, which when executed by the processor is configured to perform an operation for transposing a matrix on a SIMD multi-core processor architecture. The operation may generally include converting a matrix M in a first format to a matrix S in a SIMD format, wherein the SIMD format allows a plurality of cores on the SIMD multi-core processor architecture to each perform a 1D FFT operations on a row of data in the matrix M in parallel; retrieving a mapping for each element of the matrix S to an element in a transpose of M in a SIMD format, wherein the mappings preserve the SIMD format of S for a transposition of the matrix M; and generating, based on the retrieved mappings, a SIMD-transposed matrix T, wherein the transposed SIMD matrix T allows the plurality of cores on the SIMD multi-core processor architecture to each perform an 1D FFT operations on a transposed row of data in the matrix M in parallel.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
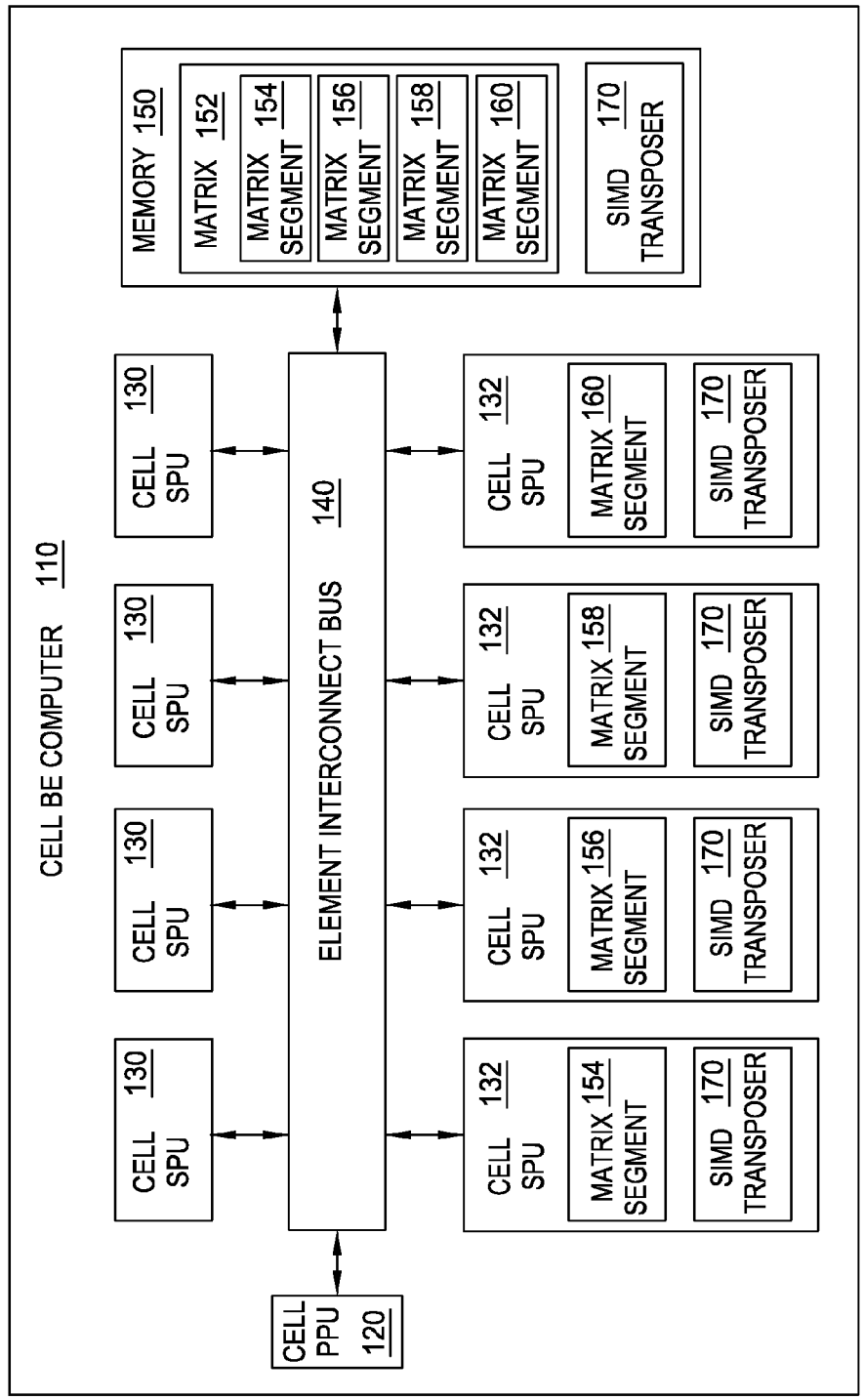
FIG. 1 is a block diagram illustrating a system for transposing array data on a SIMD multi-core processor architecture, according to one embodiment of the invention.

Embodiments of the invention provide techniques for transposing array data in a format tailored for efficient multidimensional FFTs on SIMD multi-core processor architectures. The array data may be converted into SIMD format from a multidimensional array stored in row-major order. Converted data in SIMD format may include of a sequence of blocks, where each block interleaves data from a number of rows (r rows) such that SIMD vector processors may operate on r rows simultaneously. That is, each single vector instruction processes r row elements at a time (one from each row). As a result, the execution of smaller-sized 1D FFTs is optimized in multi-core processors. Examples of smaller-sized 1D (one dimensional) FFTs include FFTs performed on 256× 256, 512×512, 1024×1024, and 2048×2048 matrixes.

To increase single-row parallelism for smaller-sized 1D FFTs, embodiments of the invention provide a SIMD data structure configured to a SIMD vector instruction to process multiple floating point values simultaneously. For example, a Cell BE processor may simultaneously process four single precision floating point values in a single SIMD vector instruction. The SIMD data structure may be tailored for processing FFTs on SIMD multi-core processors such as the Cell BE processor. Additionally, in one embodiment, the FFT algorithm may be optimized for use with the SIMD data structure.

Furthermore, operations necessary for higher-dimensional FFTs may be built using this data structure. For example, in the field of image processing, image data is commonly stored as a two-dimensional array. Further, data in the two-dimensional array is typically stored in a conventional row-major order (such as is used by the C programming language) or a column-major order (such as is used by the FORTRAN programming language). Applications that operate on the image data, such as an image viewer, typically expect the image data to be stored in a row-major (or column-major) order—typically the two-dimensional array stores image data in an (x, y) pixel format corresponding to the pixel positions.

Embodiments of the invention operate on a data structure that allows smaller-sized FFTs (such as image data in a 256× 256, 512×512, or 1024×1024 sized image captured from an MRI device) to be efficiently processed on SIMD multi-core processor architectures. The data stored in a conventional row-major order may be transformed to a SIMD data format tailored for a multi-row SIMD 1D FFT algorithm. To use the SIMD data format, the FFT algorithm may be modified to perform a standard radix-2 or radix-4 algorithm (or combinations of other radix(n) FFT algorithms) on r rows and/or columns at a time (for example, r=4). The number of rows or columns that may be processed using a single instruction corresponds to the number of floating point data elements that can fit on the SIMD registers of a processor. For 128-bit SIMD registers, r=4, i.e., 4 single precision floating point values may be placed in the register.

As stated, techniques disclosed herein define a SIMD-transpose operation. The SIMD-transpose operation may be used to transpose data (such as an image) that is already in a SIMD format. In one embodiment, after vector multi-row FFT code processes the data in groups of r rows at a time (such as r=4 in the case of 4-byte floating point data and 128-bit SIMD registers), the data may then be converted back to the conventional row-major order for viewing and/or further processing by typical applications which expect to receive the data in the row-major order (or column-major order).

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

In the following, reference is made to a Cell BE™ computer that includes a power processor element (PPE) having a processor (PPU) and its L1 and L2 caches. Each Cell BE computer also includes multiple synergistic processor elements (SPEs) that each provide a synergistic processor unit (SPU) and local store as well as a high bandwidth internal element interconnect bus (EIB). Although described herein relative to a Cell BE computer architecture, embodiments of the invention may be adapted for use with other processor architectures.

FIG. 1 is a block diagram illustrating a system 100 for transposing array data on a SIMD multi-core processor architecture, according to one embodiment of the invention. The system 100 includes a computer 110. As shown, the computer 110 is a Cell BE computer. Further, the computer 110 may be connected to other computers via a network. In general, the network may be a telecommunications network and/or a wide area network (WAN). In a particular embodiment, the network is the Internet.

As shown, the Cell BE computer 110 includes a Cell PPU 120, eight Cell SPUs 130, 132, an Element Interconnect Bus 140, a memory 150, and a storage device. Generally, the computer 110 includes one or more processors 120, 130, 132 which obtain instructions and data from a memory 150 and any storage devices (e.g., a hard-drive, flash memory, or a computer readable storage medium such as a CD or DVD-ROM). Each processor 120, 130, 132 is a programmable logic device that performs instructions, logic, and mathematical processing. Additionally, the computer 110 may include storage, e.g., hard-disk drives, flash memory devices, optical media and the like. The memory 150 includes an operating system configured to manage the operation of the computer 110. Examples of operating systems include UNIX, a version of the Microsoft Windows® operating system, and distributions of the Linux® operating system. (Note: Linux is a trademark of Linus Torvalds in the United States and other countries.)

The computer 110 may also include other peripheral devices—such as a display, keyboard mouse, network interface device, etc. As shown, the memory 150 of the computer 110 includes a SIMD transposer 170 and a matrix 154. The matrix 154 includes a plurality of matrix segments 154, 156, 158, 160, representing a subdivided portion of the matrix 152. In particular, each segment represents a collection of elements to be transposed by the SIMD transposer 170. FIGS. 2 through 8 and associated descriptions detail the structure and operation of the SIMD transposer 170 running on the computer 110. The local store of one or more cell SPUs 130, 132 includes the SIMD transposer 170 and the matrix segments 154, 156, 158, 160, according to one embodiment.

Figure 2:
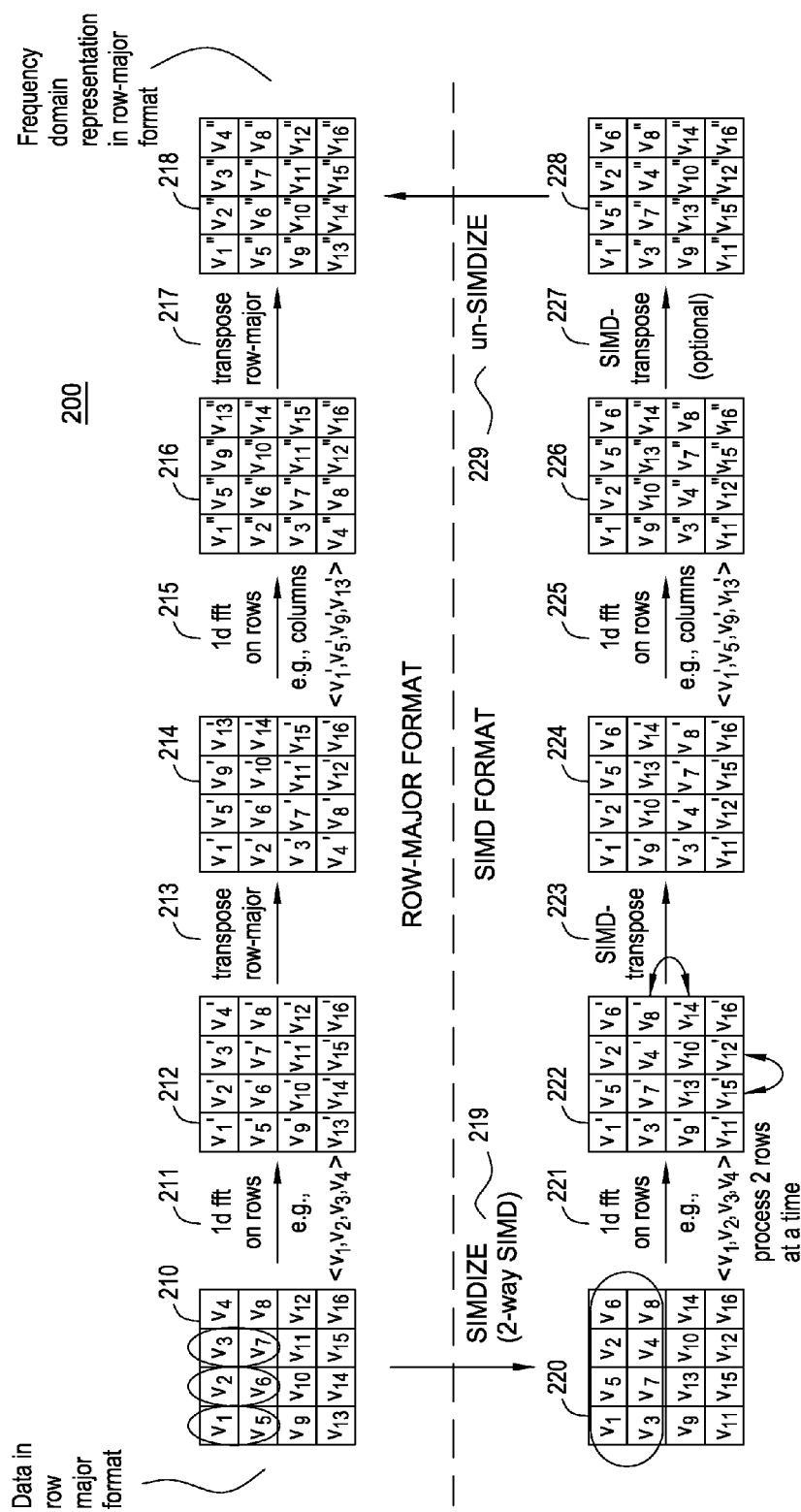
FIG. 2 illustrates a data flow for performing a 2D FFT on a 4×4 matrix, according to one embodiment of the invention.

FIG. 2 illustrates a data flow 200 for performing a 2D FFT on a 4×4 matrix, according to one embodiment of the invention. As shown, the data flow 200 includes a matrix 210 in row-major format. The matrix 210 includes values $v_1$ through $v_{16}$. Further, the matrix 210 (and all other matrices of FIG. 2) may be stored sequentially in physical memory. For example, each individual cell of the matrix 210 (containing the values $v_1$ through $v_{16}$) may correspond to sequential memory addresses of the memory 150. A 2D FFT may be performed on the matrix 210 via steps 211, 213, 215, 217, which represent operations on a matrix in a conventional data format (such as row-major format). Matrix 218 represents a result of the 2D FFT of the matrix 210.

In contrast to the matrix 210, a matrix 220 is shown in a SIMD format where the matrix values are ordered in memory such that multiple rows may be processed in parallel. For example, a 2D FFT may be performed on the matrix 220 in SIMD format via steps 221, 223, 225, 227, which represent operations on a matrix in SIMD format. Further, a reverse conversion from SIMD format to row-major format may be performed (e.g., via a step 229) to generate the matrix 218 representing the result of the 2D FFT of the matrix 210.

The 2D FFT on the matrix 210 in row-major format may include a row-wise 1D FFT (via step 211) followed by a column-wise FFT (via steps 213, 215, 217). At step 211, a 1D FFT may be performed on the rows of the matrix 210 to produce the matrix 212. For example, a 1D FFT on the first row of the matrix 210 (namely, $v_1, v_2, v_3, v_4$) may produce $v_1', v_2', v_3', v_4'$. At step 213, the matrix 212 may be transposed to produce the matrix 214. That is, the matrix 212 may be reflected by the main diagonal of the matrix 212 (i.e., $v_1', v_6', v_{11}', v_{16}'$). For example, $v_2'$ and $v_5'$ swap positions.

At step 215, a row-wise 1D FFT may be performed on the rows of the matrix 214. In effect, the row-wise 1D FFT of step 215 operates on the columns of the matrix 212 due to the transpose operation performed in step 213. For example, a 1D FFT on the first row of the matrix 214 (namely, $v_1', v_5', v_9', v_{13}'$) may produce $v_1'', v_5'', v_9'', v_{13}''$. At step 217, a second transpose operation may be performed on the matrix 216 to produce the matrix 218 (so that the rows of the matrix 218 correspond to the rows of the matrix 210). That is, the matrix 216 may be reflected by the main diagonal of the matrix 216 (i.e., $v_1'', v_6'', v_{11}'', v_{16}''$). For example, $v_5''$ and $v_2''$ swap positions. The matrix 218 (i.e., $v_1''$ through $v_{16}''$) represents a 2D FFT (i.e., a frequency domain representation) of the matrix 210 in row-major format.

Alternatively, the matrix 210 in row-major format may be converted (via step 219) to a matrix 220 in SIMD format to exploit row parallelism during computation of the 2D FFT of the matrix 210. Row-parallelism may be exploited because of a precise way in which data in the SIMD format is arranged in memory. That is, a matrix in SIMD format is configured to use a SIMD vector instruction to simultaneously process multiple floating point values stored sequentially in memory. For example, a Cell BE processor may simultaneously process four single precision floating point values in a single SIMD vector instruction. A matrix in SIMD format may be tailored for processing FFTs on such SIMD multi-core processors. In the example illustrated in FIG. 2, the matrix 220 allows two rows to be processed simultaneously. That is, one SIMD vector instruction (single instruction) may operate on two single precision floating point values (multiple data).

At step 229, the matrix 210 in row-major format may be converted into the matrix 220 in SIMD format. The SIMD format may be described as follows. Elements of a two-dimensional array may be stored in any conventional order, such as row-major order (i.e., the rows are stored in sequence) or column-major order (i.e., the columns are stored in sequence). To illustrate, assume that the two-dimensional data is a 4×4 matrix with the following values:

TABLE I

| Two-dimensional data example | | | |
| --- | --- | --- | --- |
| 1 | 2 | 3 | 4 |
| 5 | 6 | 7 | 8 |
| 9 | 10 | 11 | 12 |
| 13 | 14 | 15 | 16 |

Such a 4×4 matrix may be represented as a two-dimensional array. Source code syntax like the following may be used to declare the two-dimensional array:

TABLE II

Array declaration example - C source code int data[4][4] = { {1,2,3,4}, {5,6,7,8}, {9,10,11,12}, {13,14,15,16} };

Because the C programming language uses a row-major order, based on the above declaration, the elements are stored in the memory 150 at sequential memory addresses (labeled as 1 through 16), as follows:

TABLE III

Row-major order example

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|

Alternatively, the 4×4 matrix may be represented as a two-dimensional array that uses a column-major order. An example of a programming language that uses a column-major order is FORTRAN. In this case, the elements are stored in the memory 150 at sequential memory addresses, as follows:

TABLE IV

Column-major order example

| 1 | 5 | 9 | 13 | 2 | 6 | 10 | 14 | 3 | 7 | 11 | 15 | 4 | 8 | 12 | 16 |
|---|---|---|----|---|---|----|----|---|---|----|----|---|---|----|----|

In one embodiment, a SIMD formatter converts data into a sequence of blocks, where each block represents r rows of data. Then, r rows of data may be processed simultaneously using SIMD operations. The number of blocks may be represented by b. If m represents the number of rows of the two-dimensional data, then the number of blocks, b, may be calculated by the equation b=m/r. For example, if each block represents two rows of data (i.e., r=2), then the 4×4 matrix (i.e., m=4) includes (4/2=2) two blocks. Block 1 includes the first two rows (i.e., the rows containing the values 1 2 3 4 and 5 6 7 8) and block 2 includes the last two rows (i.e., the rows containing the values 9 10 11 12 and 13 14 15 16). The SIMD formatter places the blocks in memory sequentially one after another. However, within each block, the SIMD formatter interleaves the elements of each row, such that the first element of each row precedes the second element of each row (in terms of sequential memory addresses).

For example, block 1 of matrix 220 contains the values from the first and second rows of matrix 210. However, the SIMD formatter interleaves the elements such that all of the first elements of the rows, namely the values 1 and 5, come before any of the second elements of the rows, namely the values 2 and 6. Similarly, all of the second elements of the rows, namely the values 2 and 6, precede any of the third elements of the rows (in terms of sequential memory addresses), namely the values 3 and 7, and so forth. Illustratively, the two-dimensional data from matrix 210 is shown in matrix 220, converted to SIMD format. Elements of data in SIMD format are stored in memory 150 at sequential memory addresses, as follows:

TABLE V

SIMD format example

| 1 | 5 | 2 | 6 | 3 | 7 | 4 | 8 | 9 | 13 | 10 | 14 | 11 | 15 | 12 | 16 |
|---|---|---|---|---|---|---|---|---|----|----|----|----|----|----|----|

The two-dimensional data in SIMD format may be represented as a sequence of two blocks, with each block representing two rows of data (r=2). Within each block, data from the two rows of data is interleaved such that all of the first elements of the two rows come before any of the second elements of the two rows, and so forth for all of the elements. More generally, in the SIMD format, all of the ith elements of the rows in the block come before any of the (i+1)th elements of the rows in the block. Each element may be of any data type such as an integer, a double, or a float. Further, each element may also be a complex number, e.g., a complex number represented by two 16-bit floats stored sequentially in memory. Complex numbers may also be represented as two arrays: a first array for real parts of the complex numbers and a second array for imaginary parts of the complex numbers.

In SIMD format, the two-dimensional data is tailored for simultaneous processing of r rows at a time. Specifically, each SIMD instruction may process one element from each of the r rows, for a total of r elements being processed in a single SIMD instruction. Consequently, the SIMD format is tailored for multi-row SIMD 1D FFT algorithms because the SIMD format allows the algorithms (once modified to work with the SIMD format) to exploit row parallelism during computation.

At step 219, a SIMD formatter coverts the matrix 210 in row-major format into the matrix 220 in SIMD format. In this specific example, the matrix 220 is in a two-way SIMD format (r=2, i.e., each block represents two rows of data). For example, the first row of the matrix 220 becomes $v_1, v_5, v_2, v_6$ (instead of $v_1, v_2, v_3, v_4$ as in the matrix 210).

The 2D FFT on the matrix 220 in SIMD format may include a row-wise 1D FFT (via step 221) followed by a column-wise FFT (via steps 223, 225, 227). At step 221, a 1D FFT may be performed on elements of the matrix 220 (corresponding to rows of the matrix 220) to produce the matrix 222. For example, a 1D FFT on the elements of the matrix 220 corresponding to the first row of the matrix 210 (namely, $v_1$, $v_2, v_3, v_4$) may produce $v_1', v_2', v_3', v_4'$. The 1D FFT performed at the step 221 may exploit row parallelism of the matrix 220 in SIMD format. For example, the rows ($v_1, v_2, v_3, v_4$) and ($v_5, v_6, v_7, v_8$) may be processed simultaneously using a single SIMD vector instruction. The 1D FFT performed may include any scalar 1D FFT algorithm modified to use SIMD vector instructions in conjunction with the matrix 220 in SIMD format.

At step 223, the SIMD transposer 170 generates the matrix 224. Specifically, the SIMD transposer 170 rearranges the matrix 222 such that operations on the positions of matrix 222 (e.g., $v_1'$, $v_2'$, $v_3'$, $v_4'$) corresponding to a row of the matrix 210 (e.g., $v_1$, $v_2$, $v_3$, $v_4$) operate on a column of the matrix 210 (e.g., $v_1$, $v_5$, $v_9$, $v_{13}$). For example, the SIMD transposer 170 swaps the positions of $v_1'$, $v_2'$, $v_3'$, $v_4'$ with $v_1'$, $v_5'$, $v_9'$, and $v_{13}'$, respectively. In one embodiment, a transpose describes the correct indices representing the element's new location in the matrix 224 in a transposed SIMD format. That is, the mapping associates each element of a matrix in SIMD format to an element of a SIMD-transposed matrix. Table VI shows an illustrative mapping for a 4×4 matrix in two-way SIMD format:

TABLE VI

Element mapping example (two-way SIMD, 4 × 4 matrix)

| Input indices (matrix 222) | Output indices (matrix 224) |
|---|---|
| row 1, column 1 ($v_1'$) | row 1, column 1 |
| row 1, column 2 ($v_5'$) | row 1, column 3 |
| row 1, column 3 ($v_2'$) | row 1, column 2 |
| row 1, column 4 ($v_6'$) | row 1, column 4 |
| row 2, column 1 ($v_3'$) | row 3, column 1 |
| row 2, column 2 ($v_7'$) | row 3, column 3 |
| row 2, column 3 ($v_4'$) | row 3, column 2 |
| row 2, column 4 ($v_8'$) | row 3, column 4 |
| row 3, column 1 ($v_9'$) | row 2, column 1 |
| row 3, column 2 ($v_{13}'$) | row 2, column 3 |
| row 3, column 3 ($v_{10}'$) | row 2, column 2 |
| row 3, column 4 ($v_{14}'$) | row 2, column 4 |
| row 4, column 1 ($v_{11}'$) | row 4, column 1 |
| row 4, column 2 ($v_{15}'$) | row 4, column 3 |
| row 4, column 3 ($v_{12}'$) | row 4, column 2 |
| row 4, column 4 ($v_{16}'$) | row 4, column 4 |

In this specific example, the SIMD transposer 170 converts the matrix 222 to the matrix 224 using the defined mapping of Table VI. That is, the mapping converts a matrix 222 in SIMD format to a SIMD-transposed matrix 224, such that operations on the positions of matrix 222 (e.g., $v_1'$, $v_2'$, $v_3'$, $v_4'$) corresponding to a row of the matrix 210 (e.g., $v_1$, $v_2$, $v_3$, $v_4$) operate on a column of the matrix 210 (e.g., $v_1$, $v_5$, $v_9$, $v_{13}$). The SIMD-transposed matrix may be generally the equivalent to performing a SIMD-conversion of a transpose of the matrix 210 in row-major format.

In the example of Table VI, the SIMD transposer 170 swaps the middle two rows of the matrix 222 and swaps the middle two elements of each row of the matrix 222.

Although embodiments are described herein with reference to a SIMD-transpose operation of a 4×4 matrix in two-way SIMD format, those skilled in the art will recognize that embodiments of the invention may be adapted to support other matrix sizes (such as a 256×256 matrix, and including matrices having sizes other than powers of two), other matrix types (such as higher dimensionality matrices, e.g., 3D and 4D matrices), and other SIMD format types (such as four-way SIMD).

At step 225, a row-wise 1D FFT (identical to the operation of step 221) may be performed on the elements of the matrix 224. In effect, the row-wise 1D FFT of step 225 operates on elements of the matrix 224 corresponding to columns of the matrix 210, due to the transpose operation performed in step 223. For example, a 1D FFT on elements of the matrix 224 corresponding to the first column of the matrix 210, namely, ($v_1'$, $v_5'$, $v_9'$, $v_{13}'$), may produce ($v_1''$, $v_5''$, $v_9''$, $v_{13}''$). At step 227, a second SIMD-transpose operation may be performed on the matrix 226 to produce the matrix 228 (so that the rows of the matrix 228 correspond to the rows of the matrix 220). For example, the SIMD transposer 170 may perform the mapping of Table VI in reverse to produce the matrix 228. At step 229, the matrix 228 may be converted from SIMD format back to a conventional data format (such as row-major format) to produce the matrix 228.

Figure 3:
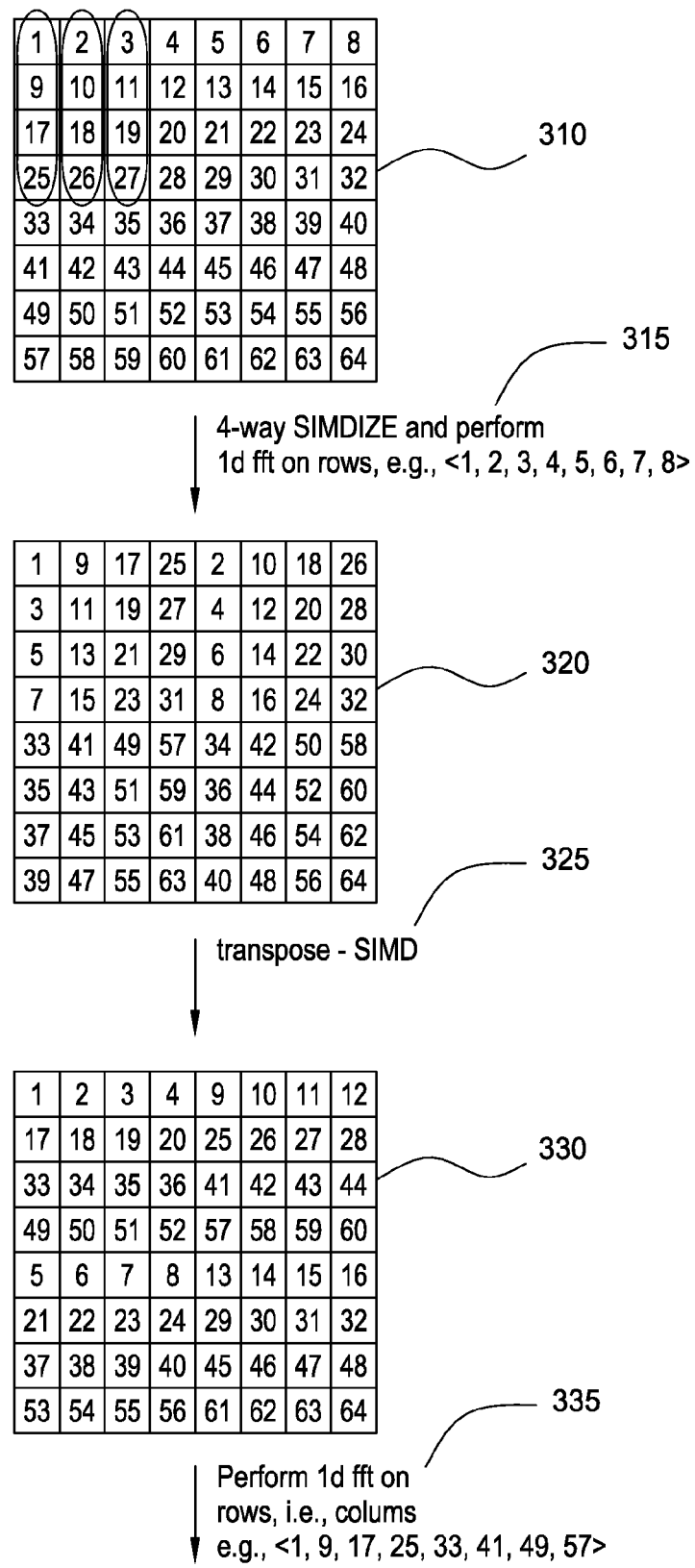
FIG. 3 illustrates a data flow for performing a SIMD-transpose on an 8×8 matrix in four-way SIMD format, according to one embodiment of the invention.

FIG. 3 illustrates a data flow 300 for performing a SIMD-transpose on an 8×8 matrix in four-way SIMD format, according to one embodiment of the invention. In the data flow 300, the symbols "$v_1$" through "$v_{64}$" (and $v_1'$ through $v_{64}'$) are simplified to read "1" through "64". That is, "1" through "64" do not represent actual numerical values, but represent matrix elements of the matrix 310. As shown, the data flow 310 includes a matrix 310 in row-major format. The matrix 310 (and all other matrices of FIG. 3) may be stored sequentially in physical memory. For example, each individual cell of the matrix 310 (containing the symbols 1 through 64) may correspond to sequential memory addresses of the memory 150. At step 315 (which corresponds to steps 219 and 221 of FIG. 2), the matrix 310 is converted to four-way SIMD format (and a 1D FFT is performed on rows of the matrix 310) to produce a matrix 320. At step 325 (which corresponds to step 223 of FIG. 2), the SIMD transposer 170 performs a SIMD transpose on the matrix 320 to generate the matrix 330. A mapping for the 8×8 matrix (or for a matrix of any size) may be generated using the general technique for generating the mapping for the 4×4 matrix (e.g., of Table VI).

That is, as noted, the mappings may be used to preserve a SIMD format for a transposed matrix—allowing multiple rows of the matrix to be processed in parallel. In one embodiment, the mappings for a given matrix size (e.g., 4×4, 8×8, 2556×256, etc) may be hard coded and used to identify how the SIMD transposer should swap elements of a SIMD formatted matrix to create a transposed SIMD formatted matrix.

Thus, generally, the SIMD transposer 170 rearranges the matrix 320 such that operations on the positions of matrix 320 (e.g., 1 through 8) corresponding to a row of the matrix 310 operate on a column of the matrix 310 (e.g., 1, 9, 17, 25, 33, 41, 49, and 57). For example, the SIMD transposer 170 swaps the positions of $v_2'$, $v_{10}'$, $v_{18}'$, $v_{26}'$ with $v_9'$, $v_{10}'$, $v_{11}'$, and $v_{12}'$, respectively. The SIMD-transposed matrix may be the equivalent to performing a transpose of the matrix 310 in row-major format.

At step 335 (which corresponds to step 225 of FIG. 2), a 1D FFT may be performed on elements of the matrix 330 (corresponding to columns of the matrix 310). The 1D FFT performed at the step 335 may exploit column parallelism of elements of the matrix 320 in SIMD format (corresponding to columns of the matrix 310). For example, four columns (1, 9, 17, 25, 33, 41, 49, 57), (2, 10, 18, 26, 34, 42, 50, 58), (3, 11, 19, 27, 35, 43, 51, 59), and (4, 12, 20, 28, 36, 44, 52, 60) may be processed simultaneously using a single SIMD vector instruction.

Figure 4:
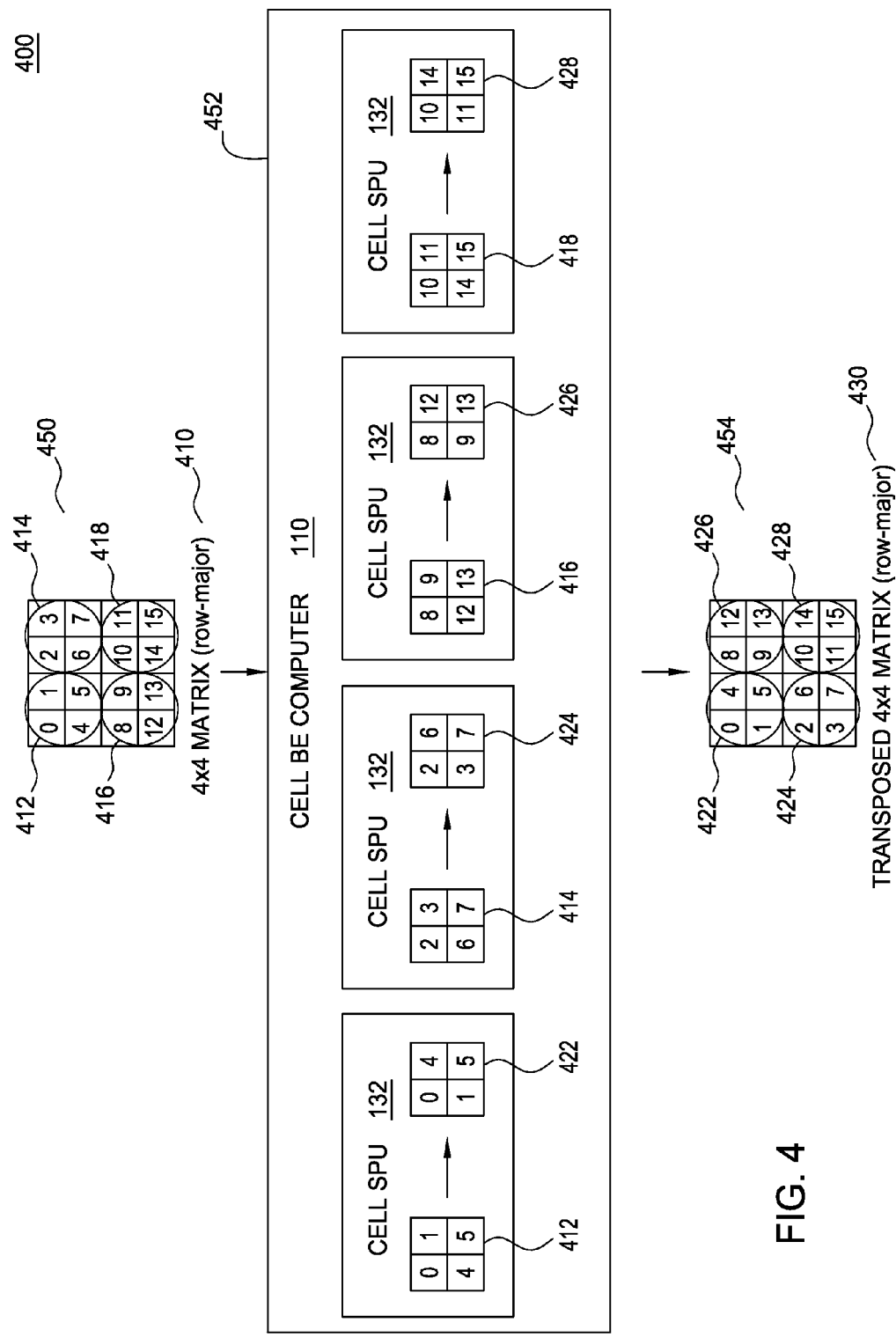
FIG. 4 illustrates a data flow for simultaneously transposing segments of a matrix, according to one embodiment of the invention.

FIG. 4 illustrates a data flow 400 for transposing a matrix, according to one embodiment of the invention. As shown, the data flow 400 includes a matrix 410 in row-major format using matrix indices of 0 through 15. At step 450, the SIMD transposer 170 divides the matrix 410 into a plurality of segments 412, 414, 416, 418. The SIMD transposer 170 may divide a matrix into a plurality of segments based on a size of the matrix and a count of processing elements of the computer 110. Illustratively, the SIMD transposer 170 divides the matrix 410 into four segments: (0, 1, 4, 5), (2, 3, 6, 7), (8, 9, 12, 13), and (10, 11, 14, 15). The processing elements of the computer 110 may simultaneously transpose the four segments.

At step 452, the SIMD transposer 170 on Cell SPUs $132_{1-4}$ transpose the segments 412, 414, 416, 418. For example, Cell SPU $132_1$ transposes a segment 412 to produce a transposed segment 422. At step 454, the SIMD transposer 170 executing on each of the plurality of processing elements moves the transposed segments 422, 424, 426, 428 from local stores of the CELL SPUs 132 to the memory 150. For example, CELL SPU $132_2$ operating on the segment 414 stores the transposed segment 424 in matrix 430. After step 454, the SIMD transposer 170 executing on the Cell PPU 120 may, if necessary, further reorganize the matrix 430 to complete the transpose operation. For example, the SIMD transposer 170 may swap elements from different segments 422, 424, 426, 428 to complete the transpose operation. The resulting matrix may generally be equivalent to a SIMD-conversion of a transpose of the matrix 410.

Figure 5:
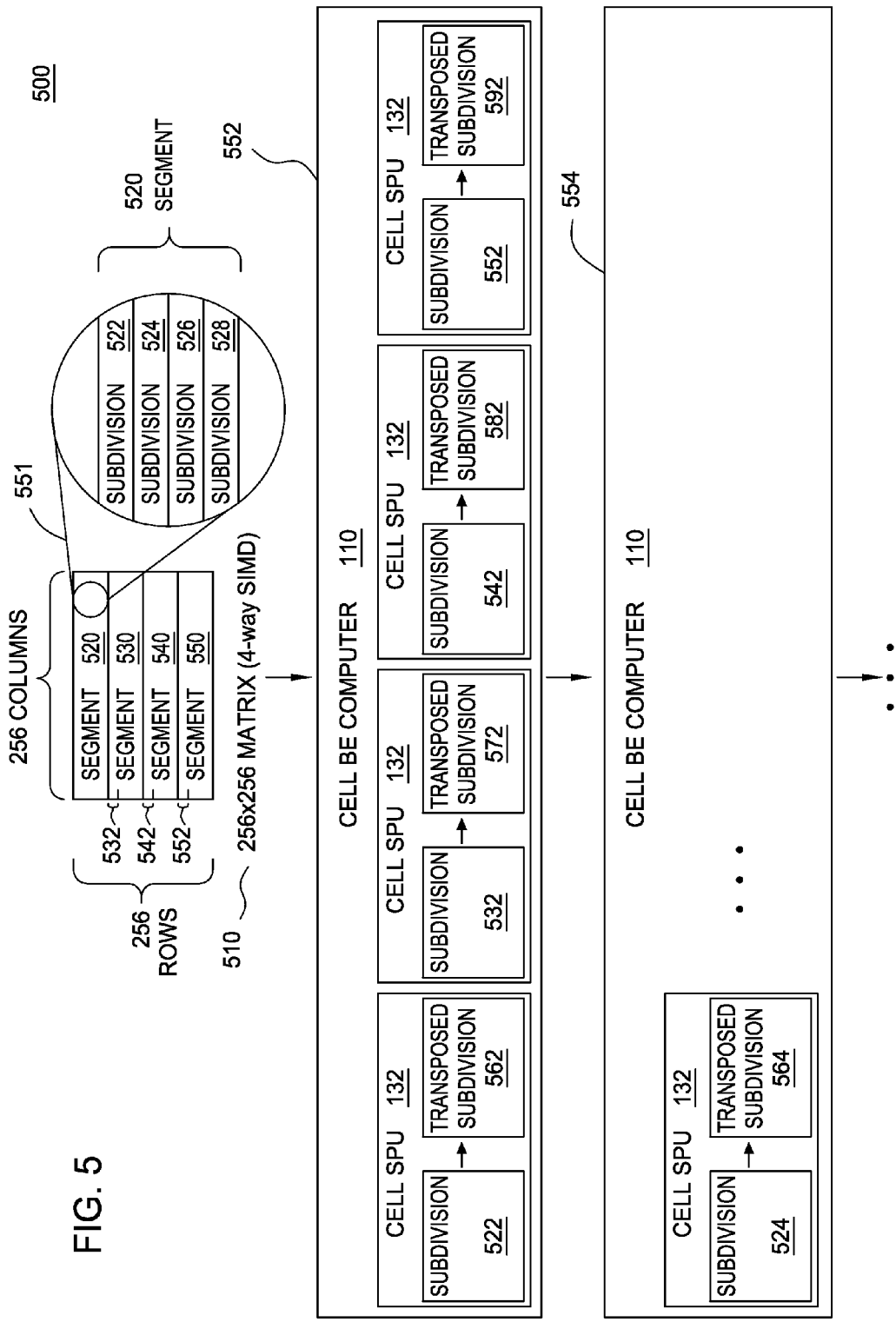
FIG. 5 illustrates a data flow for simultaneously transposing subdivisions of a matrix, according to one embodiment of the invention.

FIG. 5 illustrates a data flow 400 for simultaneously transposing subdivisions of a matrix, according to one embodiment of the invention. Unlike FIG. 4, in which each entire segment is accommodated by the local store of each processing element, FIG. 5 illustrates a scenario in which the each segment exceeds the size of local store of any processing element. As shown, the data flow 500 includes a 256×256 matrix 510. At step 551, the SIMD transposer 170 divides the matrix 510 into a plurality of segments, according to one embodiment. For example, the SIMD transposer 170 may device the matrix 510 into four segments 520, 530, 540, 550. The SIMD transposer 170 may also assign each segment 520, 530, 540, 550 to be transposed by a processing element 132. For example, the SIMD transposer 170 may assign the segment 520 to a first Cell SPU 132, the segment 530 to a second Cell SPU 132, the segment 540 to a third Cell SPU 132, and the segment 550 to a fourth Cell SPU 132.

However, the local store of a processing element 132 may not accommodate an entire segment. For example, the segment 520 may exceed the size of the local store for a Cell SPU 132. In one embodiment, the SIMD transposer 170 may divide a segment into a plurality of subdivisions, based on a size of the local store of a processing element (such as a Cell SPU). For example, the SIMD transposer 170 may divide a segment 520 into four subdivisions 522, 524, 526, 528. Each subdivision 522, 524, 526, 528 may be of a size not exceeding the size of the local store of a processing element 132.

At step 552, each processing element simultaneously transposes the first subdivision 522, 523, 542, 552 of the respective assigned segment 520, 530, 540, 550 to produce a first transposed subdivision 562, 572, 582, 592. At step 552, each processing element simultaneously transposes the second subdivision (e.g., element 524) of the respective assigned segment (e.g., element 520) to produce a second transposed subdivision (e.g., element 564), and so forth until all subdivisions have been transposed.

Figure 6:
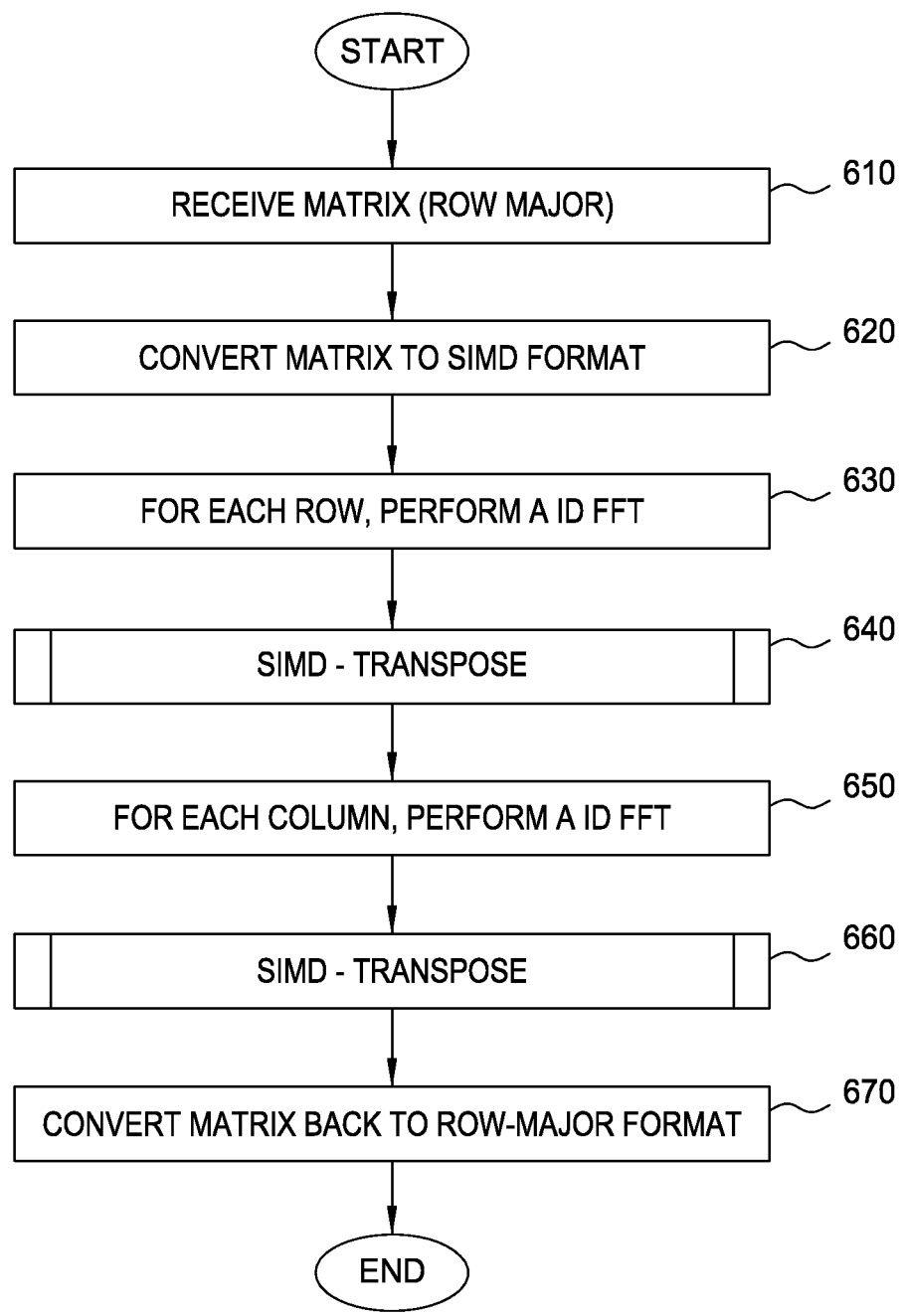
FIG. 6 is a flowchart depicting a method for performing efficient FFTs on a SIMD multi-core processor architecture, according to one embodiment of the invention.

FIG. 6 is a flowchart depicting a method 600 for performing efficient FFTs on a SIMD multi-core processor architecture, according to one embodiment of the invention. As shown, the method 600 begins at step 610, where the SIMD transposer 170 receives a matrix in a conventional data format. For example, the SIMD transposer may receive the matrix 210 of FIG. 2. At step 620, the SIMD transposer 170 converts the matrix to SIMD format. FIG. 2 shows an example where the matrix 220 is generated (e.g., via step 219). Importantly, SIMD vector processors may simultaneously operate on multiple rows (two rows in this specific example) of the matrix in SIMD format. At step 630, the SIMD transposer performs a 1D FFT for each row of the received matrix. FIG. 2 shows an example where the matrix 222 is generated (e.g., via step 221).

At step 640, the SIMD transposer 170 may SIMD-transpose the matrix. FIG. 2 shows an example where the matrix 224 is produced (e.g., via step 223). At step 650, the SIMD transposer 170 performs a 1D FFT for each column of the received matrix. FIG. 2 shows an example where the matrix 226 is generated (e.g., via step 225). At step 660, the SIMD transposer 170 may perform another SIMD-transpose on the matrix. For example, as shown in FIG. 2, the matrix 226 is SIMD-transposed into the matrix 228 (e.g., via step 227). At step 670, the SIMD transposer may convert the matrix back to a conventional data format. For example, the SIMD transposer may perform the step 229 of FIG. 2 to produce the matrix 218. After step 670, the method 600 terminates.

Although embodiments are described herein with reference to a SIMD transposer 170 that performs SIMD conversions, 1D FFTs, and SIMD transposes, the embodiments described herein are intended to be illustrative and not limiting of the invention, and other embodiments are broadly contemplated. For example, the conversion, transposition, and FFT functions may be performed by different software modules organized in a variety of ways.

Figure 7:
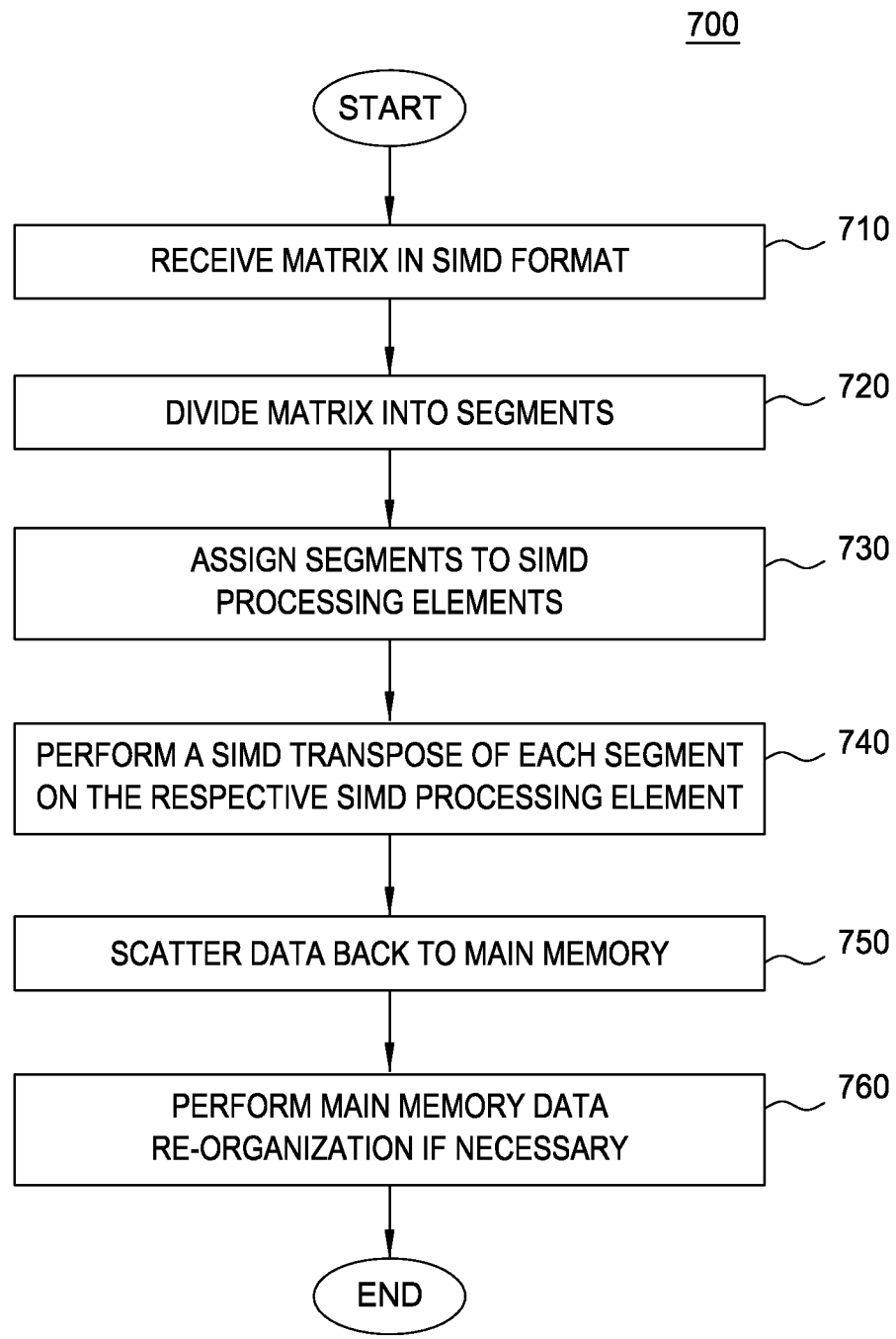
FIG. 7 is a flowchart depicting a method for transposing data in SIMD format, according to one embodiment of the invention.

FIG. 7 is a flowchart depicting a method 700 for transposing data in SIMD format, according to one embodiment of the invention. The method 700 may be performed by the SIMD transposer 170 of FIG. 1. The steps of the method 700 correspond to steps 640 and 660 of FIG. 6 and are described in conjunction with the element mapping examples of Tables VI and VII.

As shown, the method 700 begins at step 710, where the SIMD transposer 170 receives a matrix in SIMD format. For example, the SIMD transposer may receive the matrix 222 of FIG. 2. At step 720, the SIMD transposer 170 divides the matrix into a plurality of segments, based on the size of the matrix and a count of the processing elements on the computer 110. FIG. 4 shows an example where the matrix 410 of FIG. 4 is divided into four segments 412, 414, 416, 418.

At step 730, the SIMD transposer 170 assigns each segment to a processing element. For example, the SIMD transposer 170 may assign the segment 412 of FIG. 4 to a first Cell SPU 132. The SIMD transposer 170 may also determine if a segment exceeds the size of the local store of the assigned processing element. If so, the SIMD transposer 170 may divide each segment into a plurality of subdivisions, each subdivision not exceeding the size of the local store of the assigned processing element. For example, the SIMD transposer 170 may divide the segment 520 of FIG. 5 into subdivisions 522, 524, 526, 528.

At step 740, the SIMD transposer 170 executing on each assigned processing element may transpose the respective segment of the matrix. For example, the first Cell SPU 132 of FIG. 4 may transpose segment 412 to produce transposed segment 422. At step 750, each assigned processing element may scatter the transposed segments from the respective local store to the main memory 150. For example, the third Cell SPU 132 of FIG. 4 may scatter the transposed segment 426 to segment position 424 of the transposed matrix 430 in the main memory 150. At step 760, the SIMD transposer 170 performs reorganizes the transposed matrix 430 as necessary to complete the transpose operation. For example, the SIMD transposer 170 may swap elements between segments to complete the transpose operation. After step 760, the method 700 terminates.

Figure 8:
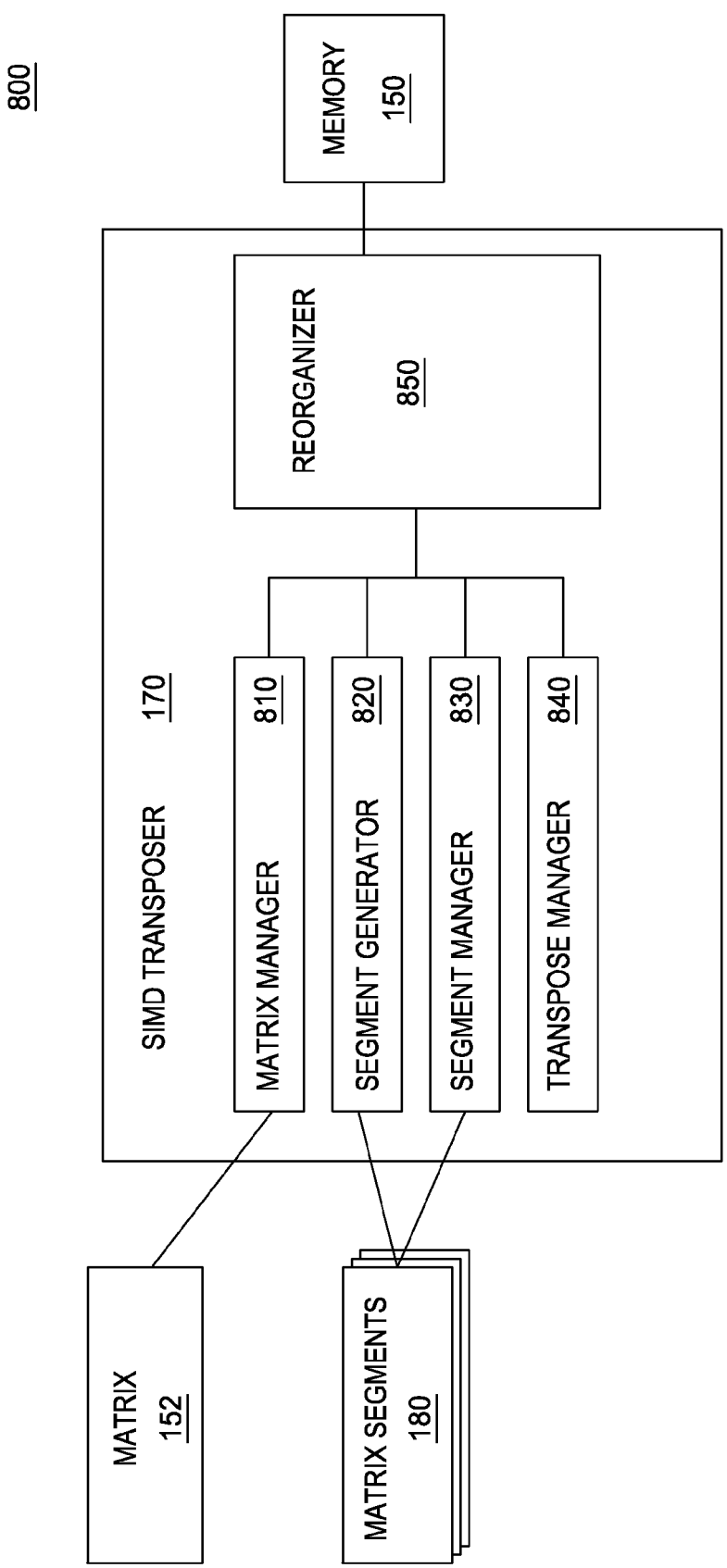
FIG. 8 is a block diagram illustrating components of a SIMD transposer, according to one embodiment of the invention.

FIG. 8 is a block diagram 800 illustrating components of the SIMD transposer 170 of FIG. 1, according to one embodiment of the invention. As shown, the SIMD transposer 170 includes a matrix manager 810, a segment generator 820, a segment manager 830, a transpose manager 840, and a reorganizer 850. As shown, the matrix manager 810 may be configured to receive a matrix 152 in SIMD format. For example, the matrix manager 810 may receive the matrix 222 of FIG. 2. Further, the segment generator 820 may produce a plurality of segments 180 based on the received matrix 152. For example, the segment generator 820 may produce the segments 412, 414, 416, 418 of FIG. 4 (which may correspond to the segments 154, 156, 158, 160 of FIG. 1). The segment generator 820 may also generate a plurality of subdivisions for each segment. For example, the segment generator 820 may generate the subdivisions 522, 524, 526, 528 of FIG. 5 for the segment 520.

The segment manager 830 may assign each segment to a processing element. For example, the segment manager 830 may assign the segments 412, 414, 416, 418 of FIG. 4 to the processing elements 132. Further, the transpose manager 840 defines a mapping from SIMD matrix to a SIMD-transposed matrix. For example, the transpose manager 840 may define the mapping of Table VI (for a 4×4 matrix).

The transpose manager 840 transposes each segment of the matrix 152. For example, the transpose manager 840 executing on each of the processing elements 132 may transpose the respective assigned segment 412, 414, 416, 418 of FIG. 4. The transpose manager 840 may also scatter transposed segments from local stores of the processing elements to the main memory 150. For example, the transpose manager 840 executing on the third processing element 132 of FIG. 4 may scatter the transposed segment 426 to the segment position 424 of the transposed matrix 430 in the main memory 150. Further, the reorganizer 850 rearranges elements in the memory 150, if necessary to complete the transpose of the matrix 152, according to one embodiment. For example, the reorganizer 850 may rearrange elements between segments 180.

Of course, the embodiments described herein are intended to be illustrative and not limiting of the invention, and other embodiments are broadly contemplated. Those skilled in the art will recognize, for example, that embodiments of the invention may be adapted to support matrices of other sizes (e.g., 512×512 matrices), other counts of processing elements (e.g., 32 processing elements), and other numbers of rows per block (e.g., 8-way SIMD, 16-way SIMD, etc.).

Advantageously, embodiments of the invention transpose array data on a SIMD multi-core processor architecture. In one embodiment, a SIMD transposer may receive a matrix in a SIMD format. The matrix may comprise a SIMD conversion of a matrix M in a conventional data format. The SIMD transposer may define a mapping from each element of the matrix to an element of a SIMD conversion of a transpose of M. Further, the SIMD transposer may generate a SIMD-transposed matrix T based on M and the defined mapping. A row-wise algorithm may be applied to T, without modification, to operate on columns of M.

While the foregoing is directed to embodiments of the present invention, other and further embodiments of the invention may be devised without departing from the basic scope thereof, and the scope thereof is determined by the claims that follow.

What is claimed is:

1. A computer-implemented method for transposing a matrix on a SIMD multi-core processor architecture, comprising configuring the SIMD (Single Instruction Multiple Data) multi-core processor architecture to perform an operation comprising:

converting a matrix M in a first format to a matrix S in a SIMD format, wherein the SIMD format allows a plurality of cores on the SIMD multi-core processor architecture to each perform a 1D FFT (Fast Fourier Transform) operation on a row of data in the matrix M in parallel;

retrieving a mapping for each element of the matrix S to an element in a transpose of matrix M in a SIMD format, wherein the mappings preserve the SIMD format of S for a transposition of the matrix M; and generating, based on the retrieved mappings, a SIMD-transposed matrix T, wherein the transposed SIMD matrix T allows the plurality of cores on the SIMD multi-core processor architecture to each perform an 1D FFT operation on a transposed row of data in the matrix M in parallel.

2. The computer-implemented method of claim 1, wherein the matrix in the SIMD format is configured for simultaneous processing of r rows of matrix M, wherein the converted data includes a sequence of blocks, wherein each block includes r consecutive rows of matrix M that are interleaved such that first elements of the r consecutive rows precede any second elements of the r consecutive rows in terms of sequential memory addresses to produce r interleaved rows.

3. The computer-implemented method of claim 1, wherein the first format is one of a row-major format and a column-major format.

4. The computer-implemented method of claim 1, wherein the operation further comprises:

generating s segments based on the matrix S;

assigning the s segments to s processing elements of the SIMD multi-core processor architecture, and wherein generating the SIMD-transposed matrix T comprises:

transposing each segment on a respective processing element.

5. The computer-implemented method of claim 4, wherein transposing each segment on each respective processing element occurs on memory local to each respective processing element, and wherein generating the transposed matrix T further comprises scattering, by each of the processing elements, each transposed segment to memory not local to any of the processing elements.

6. The computer-implemented method of claim 4, wherein transposing each segment on each respective processing element comprises:

dividing the respective segment into d subdivisions, each subdivision not exceeding a size of memory local to the respective processing element; and transposing each subdivision of the respective segment on each respective processing element.

7. The computer-implemented method of claim 1, wherein the matrix M stores a portion of image data captured from an MRI (Magnetic Resonance Imaging) device in a 256×256, 512×512, or 1024×1024 sized matrix.

8. A non-transitory computer-readable storage medium storing an application program configured for transposing a matrix on a SIMD (Single Instruction Multiple Data) multi-core processor architecture by performing an operation, comprising:

converting a matrix M in a first format to a matrix S in a SIMD format, wherein the SIMD format allows a plurality of cores on the SIMD multi-core processor architecture to each perform a 1D FFT (Fast Fourier Transform) operation on a row of data in the matrix M in parallel;

retrieving a mapping for each element of the matrix S to an element in a transpose of matrix M in a SIMD format, wherein the mappings preserve the SIMD format of S for a transposition of the matrix M; and generating, based on the retrieved mappings, a SIMD-transposed matrix T, wherein the transposed SIMD matrix T allows the plurality of cores on the SIMD multi-core processor architecture to each perform an 1D FFT operation on a transposed row of data in the matrix M in parallel.

9. The non-transitory computer-readable storage medium of claim 8, wherein the matrix in the SIMD format is configured for simultaneous processing of r rows of matrix M, wherein the converted data includes a sequence of blocks, wherein each block includes r consecutive rows of matrix M that are interleaved such that first elements of the r consecutive rows precede any second elements of the r consecutive rows in terms of sequential memory addresses to produce r interleaved rows.

10. The non-transitory computer-readable storage medium of claim 8, wherein the first format is one of a row-major format and a column-major format.

11. The non-transitory computer-readable storage medium of claim 8, wherein the operation further comprises:
generating s segments based on the matrix S;
assigning the s segments to s processing elements of the SIMD multi-core processor architecture, and wherein generating the SIMD-transposed matrix T comprises:
transposing each segment on a respective processing element.

12. The non-transitory computer-readable storage medium of claim 11, wherein transposing each segment on each respective processing element occurs on memory local to each respective processing element, and wherein generating the transposed matrix T further comprises scattering, by each of the processing elements, each transposed segment to memory not local to any of the processing elements.

13. The non-transitory computer-readable storage medium of claim 11, wherein transposing each segment on each respective processing element comprises:
dividing the respective segment into d subdivisions, each subdivision not exceeding a size of memory local to the respective processing element; and
transposing each subdivision of the respective segment on each respective processing element.

14. The non-transitory computer-readable storage medium of claim 8, wherein the matrix M stores a portion of image data captured from an MRI (Magnetic Resonance Imaging) device in a 256×256, 512×512, 1024×1024, or 2048×2048 sized matrix.

15. A system, comprising:
a SIMD (Single Instruction Multiple Data) multi-core processor; and
a memory containing an application program configured for transposing a matrix on the SIMD multi-core processor architecture by performing an operation comprising:
converting a matrix M in a first format to a matrix S in a SIMD format, wherein the SIMD format allows a plurality of cores on the SIMD multi-core processor architecture to each perform a 1D FFT (Fast Fourier Transform) operation on a row of data in the matrix M in parallel,
retrieving a mapping for each element of the matrix S to an element in a transpose of matrix M in a SIMD format, wherein the mappings preserve the SIMD format of S for a transposition of the matrix M, and
generating, based on the retrieved mappings, a SIMD-transposed matrix T, wherein the transposed SIMD matrix T allows the plurality of cores on the SIMD multi-core processor architecture to each perform an 1D FFT on a transposed row of data in the matrix M in parallel.

16. The system of claim 15, wherein the matrix in the SIMD format is configured for simultaneous processing of r rows of matrix M, wherein the converted data includes a sequence of blocks, wherein each block includes r consecutive rows of matrix M that are interleaved such that first elements of the r consecutive rows precede any second elements of the r consecutive rows in terms of sequential memory addresses to produce r interleaved rows.

17. The system of claim 15, wherein the first format is one of a row-major format and a column-major format.

18. The system of claim 15, wherein the operation further comprises:
generating s segments based on the matrix S;
assigning the s segments to s processing elements of the SIMD multi-core processor architecture, and wherein generating the SIMD-transposed matrix T comprises:
transposing each segment on a respective processing element.

19. The system of claim 18, wherein transposing each segment on each respective processing element occurs on memory local to each respective processing element, and wherein generating the transposed matrix T further comprises scattering, by each of the processing elements, each transposed segment to memory not local to any of the processing elements.

20. The system of claim 18, wherein transposing each segment on each respective processing element comprises:
dividing the respective segment into d subdivisions, each subdivision not exceeding a size of memory local to the respective processing element; and
transposing each subdivision of the respective segment on each respective processing element.

21. The system of claim 15, wherein the matrix M stores a portion of image data captured from an MRI (Magnetic Resonance Imaging) device in a 256×256, 512×512, or 1024×1024 sized matrix.

* * * * *